June 7, 1955 W. J. URBAN 2,710,183
EXPANDABLE WIND BOX STRUCTURE FOR SINTERING MACHINES
Filed Aug. 22, 1951 5 Sheets-Sheet 1
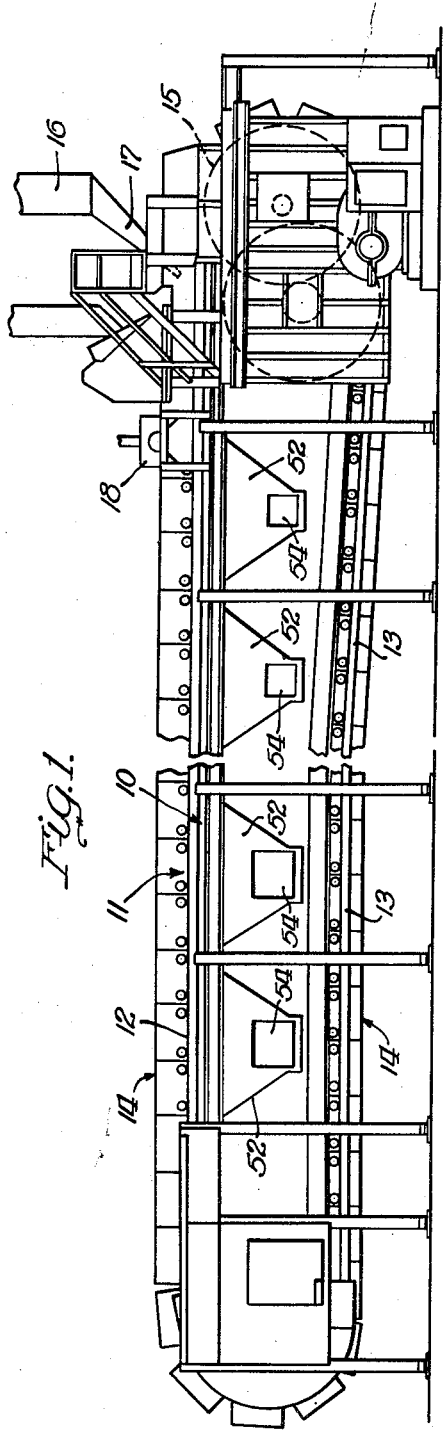
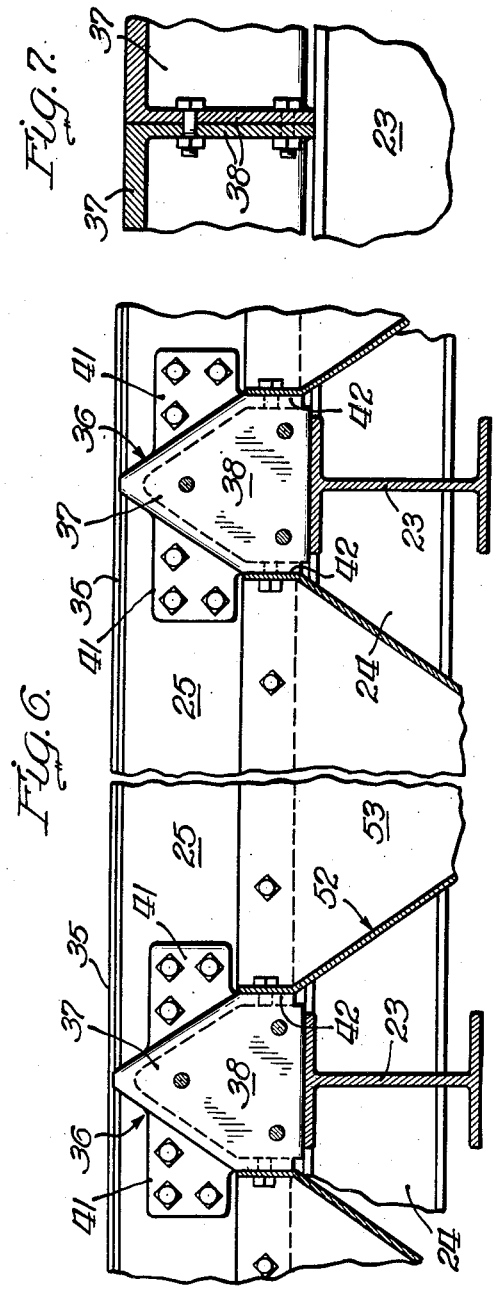
INVENTOR.
William J. Urban
BY
Brown, Jackson, Boettcher & Dienner.
Attys

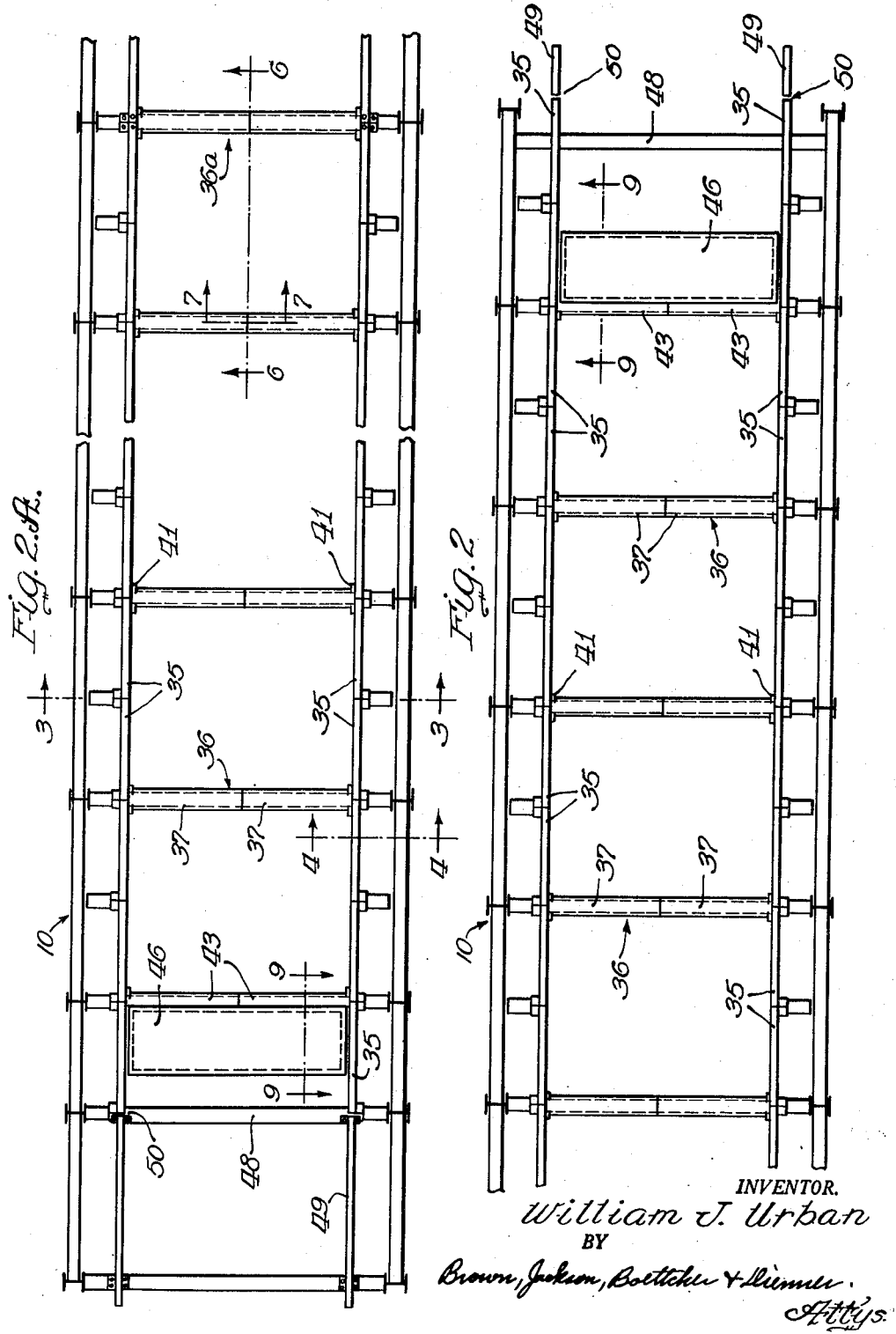

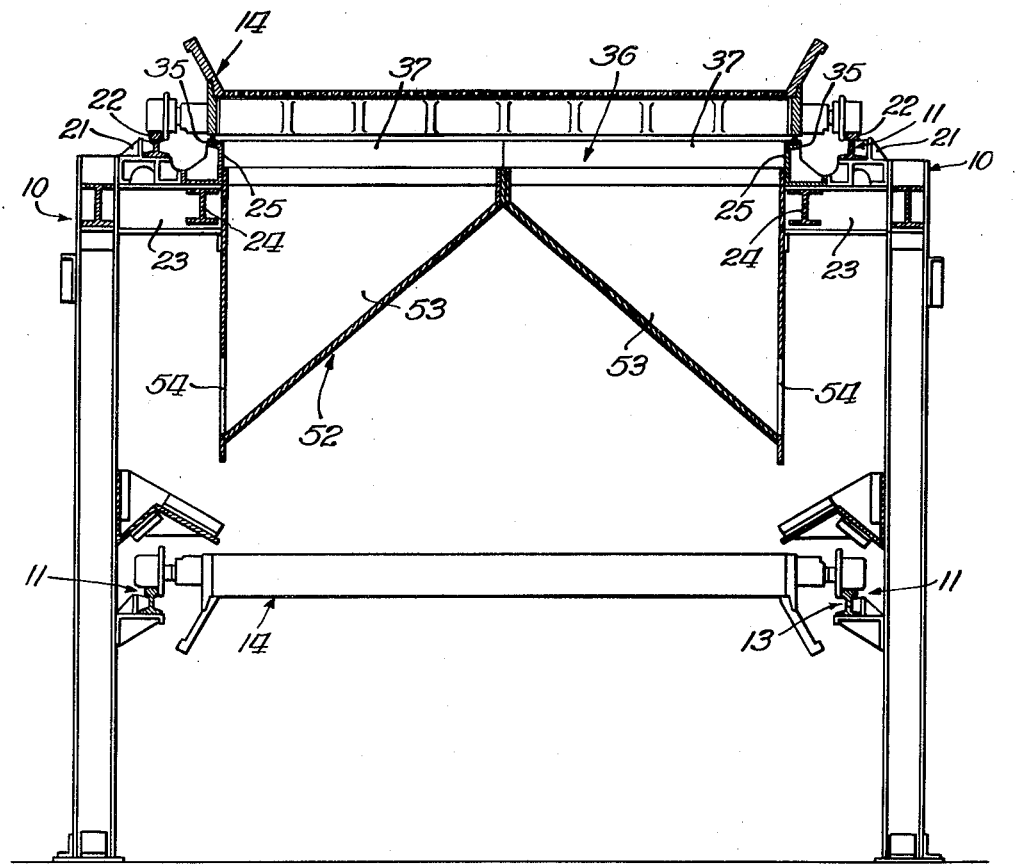
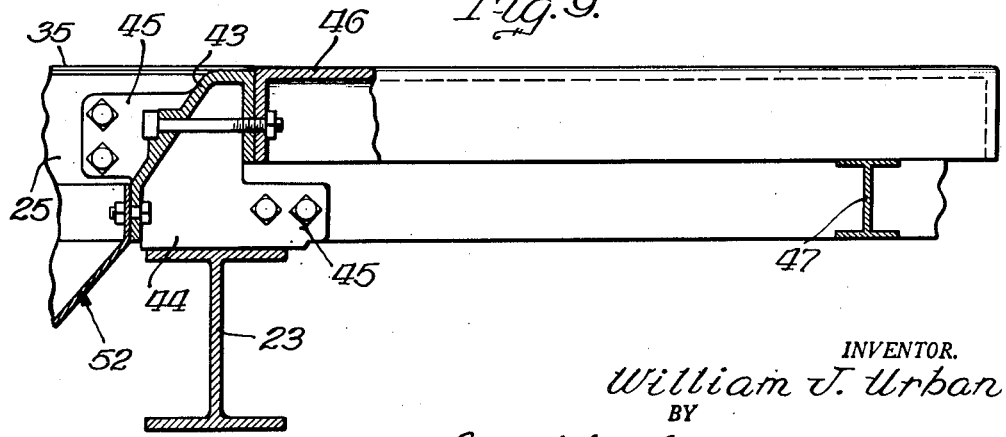

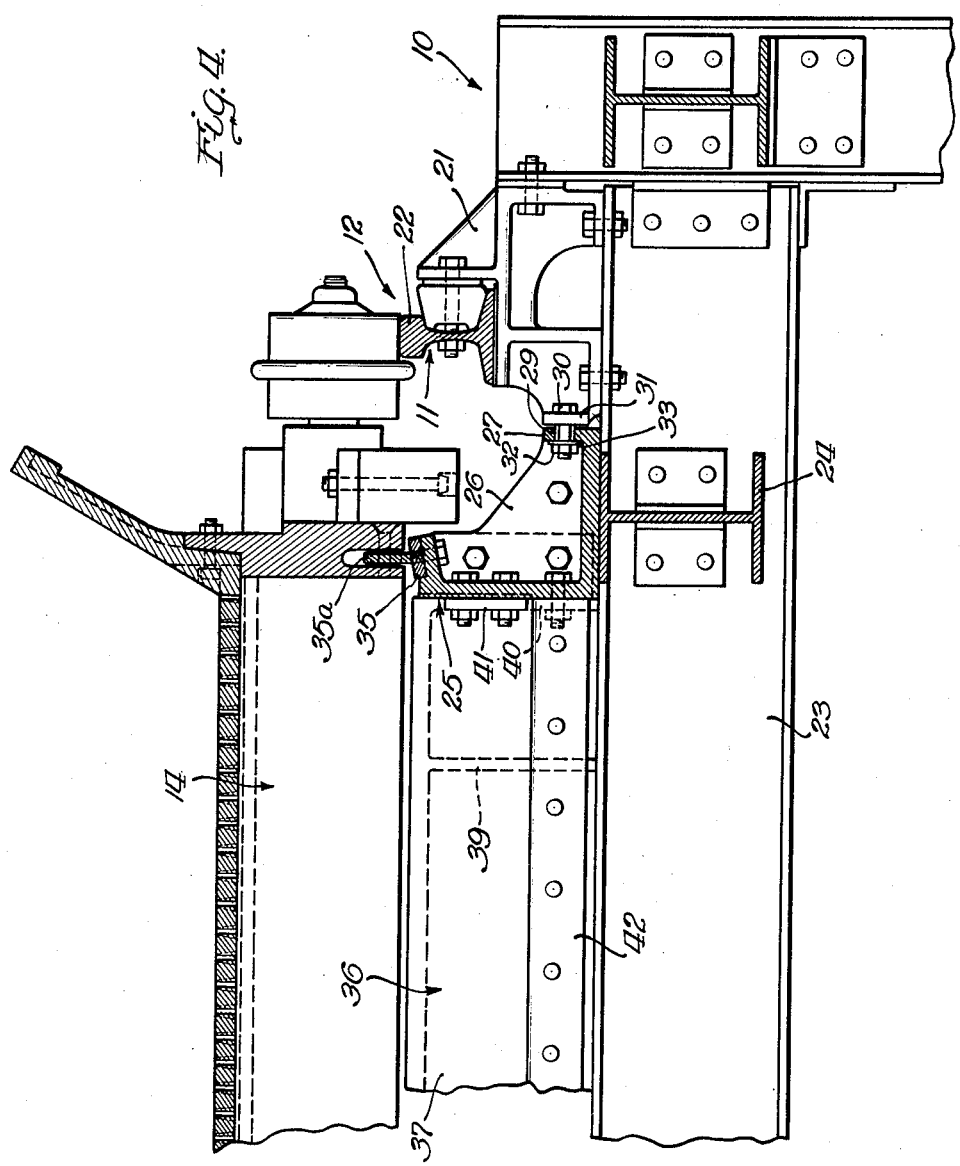

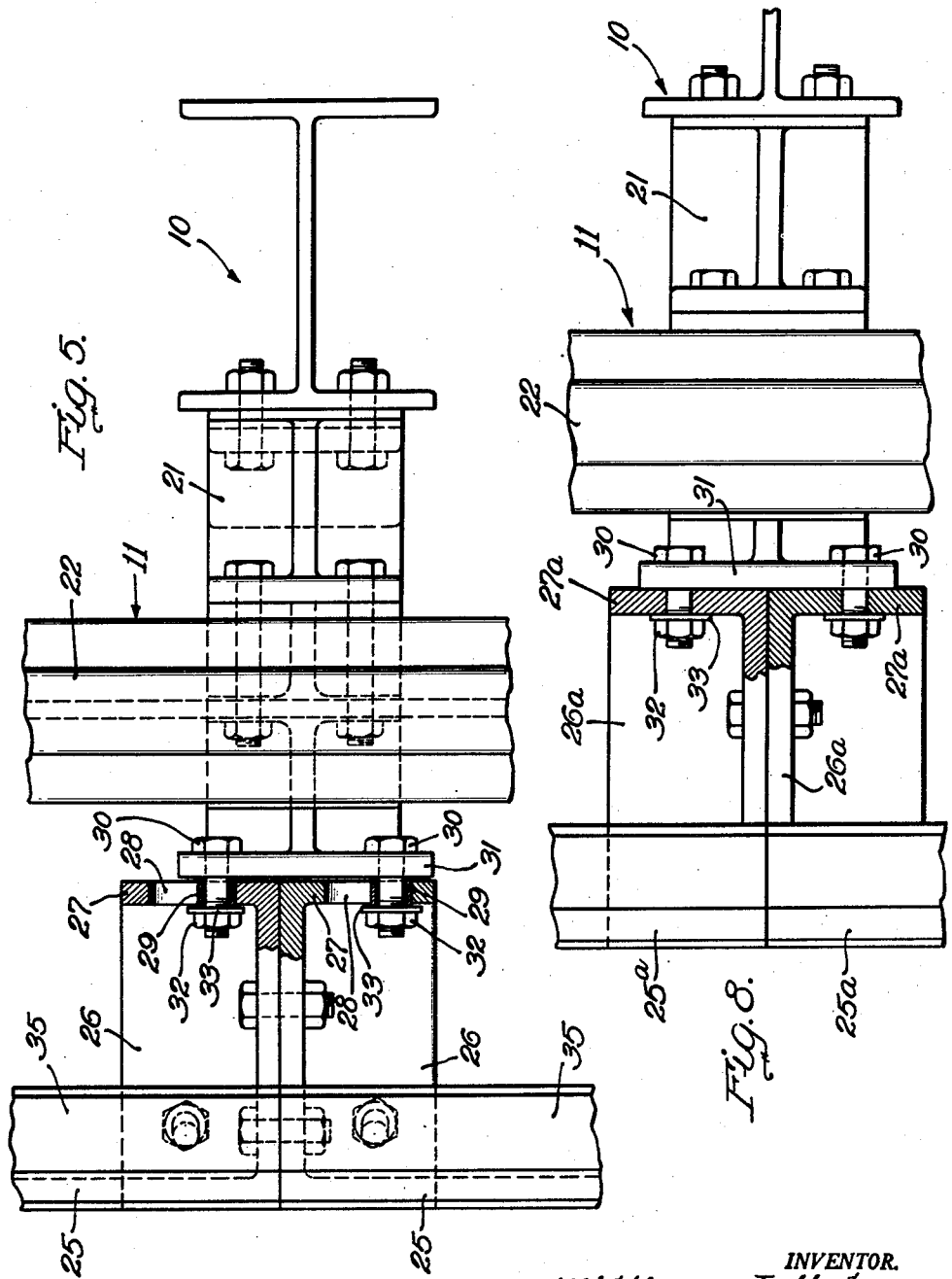

United States Patent Office 2,710,183
Patented June 7, 1955

2,710,183

EXPANDABLE WIND BOX STRUCTURE FOR SINTERING MACHINES

William J. Urban, Glen Ellyn, Ill., assignor, by mesne assignments, to Koppers Company, Inc., Pittsburgh, Pa., a corporation of Delaware Application August 22, 1951, Serial No. 243,150

6 Claims. (Cl. 266—21)

This invention relates to sintering machines, and has to do with wind box structures for such machines.

Sintering machines are extensively used for sintering ores and various other materials. It is the present practice, in sintering machines with which I am familiar, to have the boxes of the wind box assembly fixed in such manner that expansion and contraction of the wind boxes is not provided for, which results in the wind box structure and associated parts of the machine being subjected to severe, and often damaging, stresses.

My invention is directed to a wind box structure for sintering machines which avoids the objections to the present wind box structures above mentioned. To that end, I provide means whereby expansion and contraction of the wind boxes due to the severe temperatures to which they are subjected are accommodated in a manner to avoid objectionable stresses. In the sintering machine of my invention, the wind boxes are so mounted as to be capable of movement lengthwise of the main frame of the machine effective for accommodating expansion and contraction of the wind boxes. The means for mounting the wind boxes effectively supports them in a manner to guard against any objectionable looseness or play of parts without in any way interfering with the desired expansion and contraction of the wind boxes. Preferably, the wind boxes are arranged in two groups or series lengthwise of the machine with the inner ends of such series fixed to the main frame of the machine and the boxes of each series being free for expansion and contraction lengthwise of the main frame. The two series of wind boxes are so selected, with respect to the material to be sintered and the temperature to which the wind boxes of each series is subjected, that the total expansion and contraction of each series of wind boxes is approximately equal to that of the other series. That is desirable as avoiding expansion and contraction of the wind box assembly at either end of the machine to such an extent as to objectionably interfere with proper positioning of the usual dead plates at the ends of the machines. Further objects and advantages of my invention will appear from the detail description.

In the drawings:

Figure 1 is a more or less diagrammatic side view of a sintering machine, partly broken away, embodying the wind box structure of my invention;

Figures 2 and 2A together constitute a plan view, partly broken away, of the sintering machine of Figure 1, the pallets and certain other parts being omitted for clearness of illustration;

Figure 3 is a sectional view taken substantially on line 3—3 of Figure 2, on an enlarged scale;

Figure 4 is a fragmentary transverse sectional view, on an enlarged scale, taken substantially on line 4—4 of Figure 2;

Figure 5 is a fragmentary plan view of the parts shown in Figure 4, partly broken away and in section, on the same scale as Figure 4;

Figure 6 is a lengthwise sectional view, on an enlarged scale, taken substantially on line 6—6 of Figure 2;

Figure 7 is a fragmentary transverse sectional view, on an enlarged scale, taken substantially on line 7—7 of Figure 2;

Figure 8 is a view like Figure 5 but showing the fixed cross support for the wind box; and Figure 9 is a sectional view, on an enlarged scale, taken substantially on line 9—9 of Figure 2 or of Figure 2A.

The sintering machine of my present invention may be, in general, similar in structure to the machine disclosed in my Patent No. 2,485,422, issued October 18, 1949. It comprises a suitably constructed main frame 10 on which is mounted a track 11, which is an endless track and has an upper run 12 and a lower run 13. This track 11 receives a train of wheeled pallets 14 of known construction, provided with grate bars, travelling thereon and propelled along the upper run 12 thereof by sprocket wheels 15 at the feed end of the machine. The frame 10 and the track 11 are of substantially elongated rectangular or oblong shape in plan and are of much greater length than width, as is known and as is clearly shown in Figures 2 and 2A. The pallets pass beneath a charging hopper 16 to which the material, ore for example, to be sintered is delivered by a spout 17. The pallets passing beneath the hopper 16 provide a continuous travelling grate onto which the ore or like material is delivered from hopper 16 in a thick layer or bed, thus charging the pallets. From the hopper 16 the pallets pass beneath an ignition device or furnace 18 which ignites the bed of ore at the upper face thereof. The charged pallets pass over the wind box assembly as will appear more fully later, by which the bed of ore is subjected to down draft, whereby combustion is propagated downwardly therethrough. From the wind box assembly the pallets pass to and around the discharge or delivery end of the machine, where the sintered material is broken off and discharged from the pallets, which then pass about that end of the machine to the lower run of the track. The machine so far described is of known construction and operation, as previously noted.

Suitably spaced rail chairs 21 are fixed to the main frame 10 adjacent each side thereof, conveniently by being bolted thereto. Rails 22 are suitably mounted on and bolted to the rail chairs 21 to provide the track 11 upon which the pallets 14 travel. The main frame 10 is provided with suitably spaced cross frame members 23, preferably I beams, extending from side to side thereof, on which alternate ones of the rail chairs 21 seat. Suitable supports are provided between the cross I beams 23 for the other rail chairs 21, as will be understood. The I beams 23 are connected by lengthwise frame members 24, also preferably I beams, extending therebetween and secured thereto. Wind box side supports 25, of channel cross section and preferably in the form of castings, extend lengthwise of the frame members 24 and are provided at their ends with mounting brackets 26, conveniently cast integral therewith and seating on the cross frame members 23, the length of each side support 25 corresponding to the distance between the centers of adjacent cross frame members 23. As is shown more clearly in Figures 4 and 5, the brackets 26 of the adjacent wind box side supports 25 are bolted together. Further, each bracket 26 is provided, at its outer side, with an upwardly extending flange 27 having therein a lengthwise slot 28 through which extends a spacing sleeve 29. The sleeve 29 receives a bolt 30 passing through a flange 31 at the inner side of the corresponding rail chair 21. A nut 32 screws on the inner end of bolt 30 in seating contact with a spring washer 33 which seats against the inner end of sleeve 29. This sleeve 29 is of appropriate length to provide slight clearance between the flanges 27 and 31 so as to prevent binding therebetween and permit the end brackets 26 of the wind box side supports 25 to slide on the lengthwise frame members 24 and the cross frame members 23, lengthwise of the main frame 10 relative thereto and relative to the rail chairs 21. Referring now to Figure 8, flanges 27ª at the outer sides of end brackets 26ª at the inner ends of two of the wind box side supports 25ª are not slotted and are bolted tightly to flanges 31 of the corresponding rail chairs 21 at each side of the main frame 10, for a purpose to be explained more fully later. It will be understood, from what has been said, that the wind box side supports 25 are arranged in two series, one at each side of the fixed end brackets 26ª, those of each series being capable of sliding movement on the cross frame members 23 transversely thereof and lengthwise of the main frame 10 of the machine. The wind box side supports 25 have mounted thereon, conveniently by bolting, seal bars 35 which cooperate with side seal bars 35ª (Figure 4) carried by the pallets, as is known. The seal bars 35 are in lengths corresponding to the distance between the end brackets 26 of the supports 25, as is shown more clearly in Figures 2 and 2A.

Wind box cross supports 36 seat on the cross frame members 23. Each of the supports 36 conveniently is cast in two sections 37 of approximately inverted V cross section and provided at their inner ends with bolting flanges 38, as is shown more clearly in Figures 6 and 7. The flanges 38 of sections 37 seat one against the other and are bolted together to provide a rigid structure. If desired, the cross supports 36 may be formed as one continuous piece though preferably they are formed in two sections, for convenience in casting and handling. The width of the cross support 36 is materially greater than the top flange of the cross frame member 23, and each section 37 of the cross support 36 is provided interiorly with reinforcing webs 39 seating upon the top flange of cross frame member 23. Each section 37 of the wind box cross support is provided at its outer end with an end closure wall 40 and bolting flanges 41 extending outward from each side of wall 40, the latter and the flanges 41 seating against and being bolted to the ends of the corresponding two adjacent wind box side supports 25. The wind box cross support 36 is further provided, at the lower portion of each side thereof, with a vertical wall element 42 providing a seat for an end wall of a wind box, as will appear more fully later. The outermost or end wind box cross supports 43 (Figure 9) are, in general, similar to the cross supports 36 but shaped somewhat differently, approximating in cross section one half of one of the supports 36. The cross supports 43 seat upon cross frame members 23 and are provided with end closure walls 44 and bolting flanges 45 extending therefrom, seating against and bolted to the outer ends of the outer wind box side supports 25. A dead plate 46 of channel cross section is bolted to the outer side of wind box cross support 43 and seats on a frame cross member 47 for sliding movement transversely thereof. Referring now to Figures 2 and 2A, the lengths of the wear or seal bars 35 extending outward from the cross support 43, are slidably mounted, adjacent their outer ends, on a cross frame member 48 in a suitable manner, the outer ends of the seal bars 35 being spaced from aligned seal bars 49 mounted on main frame 10 in a known manner, providing therebetween a space or gap 50 to accommodate expansion of the wind box structure and the seal bars 35. The dead plate 46 and associated parts shown in Figure 2 are at the feed end of the machine. A similar dead plate and associated parts are provided at the delivery end of the machine to accommodate expansion of the wind box structure, it being noted that the frame cross member 48 at the discharge end is spaced nearer the dead plate 46 than at the feed end, and that the end lengths of the wear bars 35 are correspondingly shortened to provide the expansion spaces 50.

From what has been said, it will be understood that the wind box side supports 25 and cross supports 36, together with the fixed side supports 25ª and the end cross supports 43, provide a plurality of wind box frames arranged in two series disposed at opposite sides of a wind box cross support designated 36ª which is fixed to the main frame 10 of the machine. By fixing the cross support 36ª to the main frame of the machine, objectionable creeping of the wind box assembly in either direction lengthwise of the main frame, due to severe vibration encountered in the operation of the machine, is guarded against. Further, the wind boxes of each series, to be referred to more fully presently, can expand and contract lengthwise of the main frame as required by severe temperature variations thus avoiding subjecting the wind boxes and associated parts of the machine to excessive or damaging stresses. Also, the wind box frames are of strong and rigid construction and are effectively connected to the main frame of the machine and guided in such manner as to guard against mis-alignment and jamming of parts which could result in damage to the machine. Referring to Figures 1 to 4, inclusive, wind boxes 52 formed of plate steel and in two sections 53 transversely, as is known, fit at their upper portions in the wind box frames and are secured to the wind box cross and side supports in a suitable manner, conveniently by being riveted thereto. The sections 53 of the wind boxes 52 are provided, at their outer sides, with outlet openings 54 from which extend conduits (not shown) secured to the sides of the wind boxes, conveniently by bolting, and connected to suitable means, such as a suction fan or blower, for continuously withdrawing air and products of combustion from the wind boxes, thereby causing down draft through the material on the grates of the pallets travelling over the wind boxes, as is known.

The bed of ore or other material on the pallet grate is ignited as the pallet passes over the first wind box of the series at the feed end of the machine. Some appreciable time elapses after ignition of the surface of the bed before combustion has penetrated deeply into the bed. Accordingly, the higher temperatures to which the wind boxes are subjected do not occur until after the pallets have travelled a short distance along the track toward the delivery end of the machine, so that the first two or three pallets of the series at the feed end side of the fixed wind box cross support 36ª are not ordinarily subjected to severe temperatures. Preferably, the two series of wind boxes are such that the extent of expansion and contraction thereof is equal, or approximately so. Assuming that there are sixteen wind boxes, there may may be nine wind boxes at the feed side of the fixed cross support 36ª and seven at the delivery side thereof, to equalize the expansion and contraction of the two series. The division of the wind boxes into two series depends upon factors which are variable, such as the material under treatment, its rate of combustion and the temperature of the products of combustion, as well as the temperature and the flow of air and gases through the materials during cooling thereof after completion of combustion. In general, the wind boxes may be separated into two series in approximately the proportion above stated, bearing in mind the variable factors and the desirability of having the extent of expansion and contraction of both series of wind boxes approximately equal. It will be noted that the dead plates are attached to the respective series of wind boxes for movement lengthwise of the main frame of the machine incident to expansion and contraction of the respective series of wind boxes. The particular manner in which the dead plates are mounted is not of the essence of my invention and they may be mounted in any suitable manner which will accommodate movement thereof lengthwise of the main frame incident to expansion and contraction of the respective series of the wind boxes.

It will be understood, from what has been said, that changes in detail may be resorted to without departing from the field and scope of my invention, and I intend to include all such variations, as fall within the scope of the appended claims, in this application in which the preferred form only of my invention has been disclosed.

I claim:

1. In a continuous sintering machine, a main frame of approximately oblong shape in plan and having fixed lengthwise frame members and cross frame members extending between and fixed to said lengthwise members and spaced apart lengthwise of said main frame, an endless pallet receiving track on said main frame extending lengthwise thereof and having an upper run overlying said frame members and a lower run, said track comprising rail chairs fixed to said main frame adjacent the sides thereof and rails on said chairs, wind box side supports having end mounting brackets seating on said lengthwise frame members for relative movement lengthwise thereof, the end brackets of adjacent side supports being secured together and attached to said rail chairs by bolt and slot means accommodating lengthwise movement of said side supports relative to said rail chairs, wind box cross supports extending between and fixed to the end brackets of said side supports constituting with the latter substantially rectangular wind box frames, and wind boxes depending from and secured to said frames for movement therewith to accommodate expansion and contraction of said wind boxes.

2. In a continuous sintering machine, a main frame of approximately oblong shape in plan and a pallet receiving track thereon extending lengthwise of said frame, and a wind box assembly comprising a plurality of wind boxes disposed to underlie pallets travelling on said track, said wind boxes being arranged in two series extending lengthwise of said frame and fixed at their inner ends to said frame and otherwise free therefrom for movement lengthwise of said frame relative thereto to accommodate expansion and contraction of said wind boxes.

3. In a continuous sintering machine, a main frame of approximately oblong shape in plan and an endless pallet receiving track thereon extending lengthwise of said frame and having an upper run and a lower run, a wind box cross support fixed to said frame, a first series of movable wind box cross supports mounted on said frame at one side of said fixed support for movement lengthwise of said frame relative thereto and spaced apart lengthwise thereof, a second series of movable wind box cross supports mounted on said frame at the other side of said fixed support for movement lengthwise of said frame relative thereto and spaced apart lengthwise thereof, and wind boxes depending from and secured to said fixed and movable supports for movement with the latter to accommodate expansion and contraction of the wind boxes of the respective series.

4. In a continuous sintering machine, a main frame of approximately oblong shape in plan and a pallet receiving track thereon extending lengthwise of said frame, a plurality of wind box frames having common end members one of which is fixed to said main frame, the other of said end members being arranged in two series at opposite sides of said one member extending lengthwise of said frame and mounted thereon for movement relative thereto lengthwise thereof, and wind boxes depending from said wind box frames for movement therewith to accommodate expansion and contraction of said wind boxes.

5. In a continuous sintering machine, a main frame of approximately oblong shape in plan and a pallet receiving track thereon extending lengthwise of said frame, a wind box assembly comprising a plurality of wind boxes disposed to underlie pallets travelling on said track, mounting means supporting said wind boxes for movement lengthwise of said frame relative thereto to accommodate expansion and contraction of said wind boxes, and dead plates attached to the ends of said wind box assembly and mounted for movement lengthwise of said frame relative thereto incident to expansion and contraction of said wind box assembly.

6. In a continuous sintering machine, a main frame of approximately oblong shape in plan and a pallet receiving track thereon extending lengthwise of said frame, a plurality of wind box frames having common end members one of which is fixed to said main frame, the others of said end members being arranged in two series at opposite sides of said one member extending lengthwise of said main frame and mounted thereon for movement relative thereto lengthwise thereof, wind boxes depending from said wind box frames for movement therewith to accommodate expansion and contraction of said wind boxes, and dead plates attached to the outer ends of the respective series of wind box frames and mounted for movement lengthwise of said main frame relative thereto incident to expansion and contraction of said wind boxes.

References Cited in the file of this patent

UNITED STATES PATENTS

| Number | Name | Date |
|---|---|---|
| 1,618,205 | Knox | Feb. 22, 1927 |
| 1,690,231 | Klugh | Nov. 6, 1928 |
| 1,880,146 | Morison | Sept. 27, 1942 |
| 2,409,072 | Shallock | Oct. 8, 1946 |
| 2,485,422 | Urban | Oct. 18, 1949 |
| 2,506,569 | Agnew | May 9, 1950 |
| 2,571,582 | Kelsey | Oct. 16, 1951 |